United States Patent Office 3,651,067
Patented Mar. 21, 1972

3,651,067
STYRENE ETHERS OF AMINO ALCOHOLS
Bill Elpern, White Plains, and Victor T. Bandurco, Huntington Station, N.Y., assignors to USV Pharmaceutical Corporation
No Drawing. Filed Apr. 15, 1970, Ser. No. 28,985
Int. Cl. C07d 29/18
U.S. Cl. 260—293.83
4 Claims

ABSTRACT OF THE DISCLOSURE

Compounds of the formula

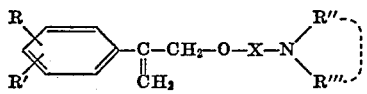

wherein X is a lower alkylene having from 2–5 carbon atoms, R and R' are hydrogen, lower alkyl, lower alkoxy or halogen, R'' and R''' are hydrogen, lower alkyl or phenyl lower alkyl, and R'' and R''' taken together with N may be piperidino, morpholino, thiomorpholino, pyrrolidino, or methylpiperazino, are potent anticonvulsants, useful in the treatment of grand mal.

---

This invention relates to new organic compounds having valuable pharmaceutical activity.

In particular, the invention relates to basic styrene ethers having the structure

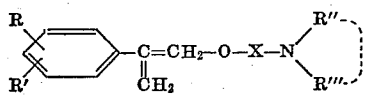

wherein X is a lower alkylene group having from 2 to 5 carbon atoms, R and R' are hydrogen, lower alkyl, such as methyl, ethyl, isopropyl, amyl, and the like, lower alkoxy, such as methoxy, ethoxy, butoxy, and the like, or halogen, and may be the same or different, and R'' and R''' may be hydrogen, lower alkyl, or phenyl lower alkyl, such as benzyl or phenylethyl, and may be the same or different, or R'', R''', and N taken together may be piperidino, morpholino, thiomorpholino, pyrrolidino, methylpiperazino, and the like. Preferably, X is ethylene or propylene and R and R' are hydrogen.

In accordance with this invention, the compounds are prepared by the reaction of an alcohol of the formula

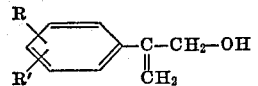

where R and R' are the same as above, with an alkali metal such as, for example, lithium, sodium, or potassium, to form an alkali metal alcoholate, which is then treated with an aminoalkyl halide of the formula

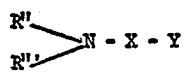

where R'', R''' and X are the same as above and Y is a halogen, such as, chlorine or bromine. Preferably, both stages of the preparation are carried out by heating in an inert solvent.

The reactant alcohols are prepared by oxidizing an appropriately substituted alpha methyl styrene of the formula

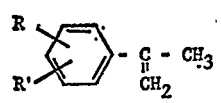

wherein R and R' are the same as above, with selenium dioxide in acetic acid-acetic anhydride solution followed by saponification of the acetyl derivative to give the free alcohol. This method is described in U.S. Pat. No. 2,537,622.

The compounds of this invention exhibit strong anticonvulsant activity against electroshock induced convulsions in mice according to the method of Swinyard, J. Am. Pharm. Ass. 38, 201 (1949), and are thus particularly useful in the treatment of convulsions in grand mal.

The compounds may be administered as the free bases or as their pharmaceutically acceptable, nontoxic acid addition salts, such as, the hydrochloride, hydrobromide, sulfate, phosphate, acetate, benzoate, cinnamate, citrate, glycolate, mandelate, and the like, in the form of tablets, capsules and elixirs.

The dosage ranges vary from about 5 to 33 mg./kg. when administered subcutaneously to about 20 to 100 mg./kg. when administered orally.

The invention will be more fully understood from the example which follows, and it is intended to cover all changes and modifications of the example of the invention herein chosen for purposes of disclosure which do not depart from the spirit of the invention.

EXAMPLE 2-piperidino-ethoxy-2-(4-chlorophenyl)-propene

To 200 ml. of a benzene solution of 11 g. of 2-(4-chlorophenyl)-2-propene-1-ol, 2.5 g. of potassium was added. The mixture was refluxed until all of the metal dissolved. To the cooled solution was added N-(2-chloroethyl)-piperidine, and the resulting mixture refluxed for 24 hours. The solution was then concentrated in vacuo and the product extracted as its hydrochloride which was then converted to the free base which in turn was converted to oxalate salt. M.P. 64–66°.

Following the procedure of the example, the following compounds were prepared:

TABLE I

[R and R' are hydrogen, X is ethylene]

| R'' | R''' | Salt | M.P. or B.P./mm., °C. |
|---|---|---|---|
| H | H | A | 136–8 |
| Me | Me | B | 92.5–4.5 |
| Et | Et | B | 81.5–2.5 |
| i-Pr | i-Pr |  | 154–58/3 |
| But | But | B | 111–2 |
| Me | Et |  | 86–90/0.05 |
| Me | Benzyl |  | 129–30/0.01 |
| Piperidino |  | A | 78–80 |
| Piperidino |  | B | 90–92 |
| Morpholino |  | B | 96–97 |
| N-methylpiperazino |  | A | 196–8 |

TABLE II

[R and R' are hydrogen, X is propylene]

| R'' | R''' | Salt | M.P. or B.P./mm., °C. |
|---|---|---|---|
| H | H | A | 86–90 |
| Me | Me | B | 113–5 |
| Et | Et |  | 106–8/0.03 |
| 2-methylpiperidino |  | A | 108–9 |

TABLE III

[R is hydrogen, X is ethylene and R'', R''' and N is piperidyl]

| R' | Salt | M.P. or B.P./mm., °C. |
|---|---|---|
| 4-i-Pr |  | 152–6/0.2 |
| 2-O-Me | B | 132–4 |
| 3-O-Me | B | 68–70 |
| 4-O-Me | B | 52–4 |

In all tables, A refers to the hydrochloride, and B refers to the oxalate.

We claim:
1. A compound of the formula

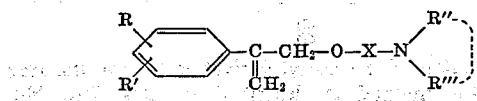

wherein R and R' are selected from the group consisting of hydrogen, lower alkyl, lower alkoxy, and halogen, and may be the same or different, X is a lower alkylene group having from 2 to 5 carbon atoms, and R" and R''' are selected from the group consisting of hydrogen, lower alkyl, and phenyl lower alkyl, and may be the same or different, and R" and R''' taken together with N are selected from the group consisting of piperidino, morpholino, thiomorpholino, pyrrolidino, and N-methylpiperazino.

2. A compound according to claim 1, wherein R and R' are hydrogen.

3. A compound according to claim 2, wherein X is an alkylene group having from 2 to 3 carbon atoms.

4. A compound according to claim 3, wherein R" and R''' taken together with N is piperidino.

References Cited

UNITED STATES PATENTS 2,537,622   1/1951   Butler _____ 260—618

HENRY R. JILES, Primary Examiner

S. D. WINTERS, Assistant Examiner

U.S. Cl. X.R.

260—570.6, 247.7 A, 240 K, 243 B, 326.5 N, 268 R, 618 R, 618 D, 618 C, 613 D, 294 S; 424—267, 330, 248, 246, 274, 250